(12) United States Patent
Park

(10) Patent No.: US 7,786,791 B2
(45) Date of Patent: Aug. 31, 2010

(54) INTERNAL VOLTAGE GENERATION CIRCUIT

(75) Inventor: Jae-Boum Park, Kyoungki-Do (KR)

(73) Assignee: Hynix Semiconductor Inc., Gyeonggi-do (KR)

( * ) Notice: Subject to any disclaimer, the term of this patent is extended or adjusted under 35 U.S.C. 154(b) by 97 days.

(21) Appl. No.: 12/130,623

(22) Filed: May 30, 2008

(65) Prior Publication Data

US 2009/0219080 A1    Sep. 3, 2009

(30) Foreign Application Priority Data

Feb. 29, 2008    (KR) ...................... 10-2008-0018762

(51) Int. Cl.
*G05F 1/10*    (2006.01)
(52) U.S. Cl. ...................................... 327/536
(58) Field of Classification Search ................ 327/535, 327/536, 537
See application file for complete search history.

(56) References Cited

U.S. PATENT DOCUMENTS 6,137,343 A  * 10/2000 Matano ....................... 327/535
7,173,478 B2 *  2/2007 Chun ......................... 327/536
7,310,014 B2 * 12/2007 Lee et al. .................... 327/536
7,449,944 B2 * 11/2008 Byeon et al. ................ 327/589

FOREIGN PATENT DOCUMENTS

KR    1020060113266 A    11/2006

OTHER PUBLICATIONS

Notice of Preliminary Rejection issued from Korean Intellectual Property Office on Jul. 21, 2009 with an English Translation.

* cited by examiner

*Primary Examiner*—Jeffrey S Zweizig
(74) *Attorney, Agent, or Firm*—IP & T Law Firm PLC

(57) ABSTRACT

Internal voltage generation circuit including a reference oscillation signal generator for generating a reference oscillation signal according to a comparison result of a pumping voltage with a reference voltage, an oscillation signal generator for generating a plurality of oscillation signals with a predetermined phase difference and a pumping voltage generator for generating a pumping voltage through sequential charge pumping operations performed in response to the plurality of oscillation signals, respectively.

10 Claims, 8 Drawing Sheets

INTERNAL VOLTAGE GENERATION CIRCUIT

CROSS-REFERENCE TO RELATED APPLICATIONS

The present invention claims priority of Korean patent application number 10-2008-0018762, filed on Feb. 29, 2008, which is incorporated by reference in its entirety.

BACKGROUND OF THE INVENTION

The present invention relates to semiconductor design technology, and more particularly, to a pumping voltage generation circuit of an internal voltage generation circuit, for performing a charge pumping operation to generate a pumping voltage higher than an external power voltage.

Generally, an internal voltage generation circuit for more efficient power consumption is mounted inside a semiconductor device including double data rate synchronous dynamic random access memory (DDR SDRAM) to generate internal voltages of various voltage levels. These internal voltages include a core voltage and a peri voltage having voltage levels between an external power voltage and a ground voltage, a pumping voltage having a voltage level higher than an external power voltage, and a substrate bias voltage having a voltage level lower than the ground voltage. Generally, the pumping voltage and the substrate bias voltage are generated by performing a charge pumping operation. Hereinafter, a pumping voltage generation circuit for generating an internal voltage through the charge pumping operation will be described.

FIG. 1 is a block diagram of a typical pumping voltage generation circuit.

Referring to FIG. 1, the pumping voltage generation circuit includes a voltage level detector 110, an oscillation signal generator 130, and a pumping voltage generator 150.

The voltage level detector 110 detects a voltage level difference between a reference voltage V_REF and a fed-back pumping voltage V_PP and outputs the detected voltage level difference as a detection signal V_DET. The oscillation signal generator 130 receives the detection signal V_DET and performs an oscillation operation to generate an oscillation signal OSC of a predetermined frequency. The pumping voltage generator 150 receives an oscillation signal OSC and performs a charge pumping operation to generate a pumping voltage V_PP.

Since the detailed circuit configurations of the voltage level detector 110, the oscillation signal generator 130, and the pumping voltage generator 150 are already known in the art, detailed description thereof will be omitted and an operation thereof will be briefly described below.

When the voltage level of the pumping voltage V_PP is lower than that of the reference voltage V_REF, the voltage level detector 110 detects this lowered voltage level, and outputs a detection signal V_DET of, for example, a logic high level. The oscillation signal generator 130 receives this detection signal V_DET and performs an oscillation operation to generate an oscillation signal OSC of a predetermined frequency. The pumping voltage generator 150 performs a charge pumping operation in response to this oscillation signal OSC. Therefore, the voltage level of the pumping voltage V_PP is increased more and more.

When the voltage level of the pumping voltage V_PP is higher than that of the reference voltage V_REF, the voltage level detector 110 outputs a detection signal V_DET of a logic low level in response thereto. The oscillation signal generator 130 receives this detection signal V_DET and does not perform an oscillation operation. Therefore, the voltage level of the pumping voltage V_PP is not increased any more compared to the reference voltage V_REF.

Meanwhile, the pumping voltage generator 150 uses a trippler type pumping circuit and manages a pumping voltage V_PP that is four times higher than a maximum external power voltage. For reference, the pumping voltage generator 150 performs a charge pumping operation in response to the rising edge and the falling edge of an oscillation signal OSC. At this point, noise usually occurs in the generated pumping voltage V_PP.

Meanwhile, semiconductor devices are being developed in the direction of high integration and large capacity, and thus more and more circuits use a pumping voltage V_PP. Therefore, pumping voltage generation circuits that generate a pumping voltage V_PP also increase. Accordingly, noise occurring in the pumping voltage V_PP also increases. In other words, a plurality of pumping voltage generation circuits are provided and simultaneously driven to generate a pumping voltage V_PP. That is, all of the pumping voltage generation circuits perform a charge pumping operation in response to a rising edge, and perform a charge pumping operation in response to a falling edge. For example, when each pumping voltage generation circuit generates a pumping voltage V_PP having a constant noise in response to a rising edge, a very large noise is generated in a finally generated pumping voltage V_PP.

The pumping voltage V_PP in which a noise has seriously occurred may cause a malfunction to a circuit using the pumping voltage V_PP. For reference, a DDR SDRAM inputting/outputting data at high speed defines 'tDV' as its specification in association with a valid data window. A noise occurring in the pumping voltage V_PP is closely related to 'tDV'. Therefore, to stably secure 'tDV', it is indispensable to reduce a noise of the pumping voltage V_PP as much as possible.

Also, providing a plurality of pumping voltage generation circuits in a limited space may act as much burden when a semiconductor is designed. In case of having to provide a plurality of pumping voltage generation circuits, a net die yield per wafer may be reduced.

SUMMARY OF THE INVENTION

Embodiments of the invention are directed to providing an internal voltage generation circuit that can reduce noise occurring in an internal voltage as much as possible.

Embodiments of the invention are also directed to providing an internal voltage generation circuit that can generate a pumping voltage whose noise is minimized in securing 'tDV'.

Embodiments of the invention are also directed to providing an internal voltage generation circuit that can increase net die yield per wafer using a minimized circuit construction in generating a desired internal voltage.

In accordance with an aspect of the invention, there is provided a reference oscillation signal generator for generating a reference oscillation signal according to a result of comparison of a pumping voltage with a reference voltage, an oscillation signal generator for generating a plurality of oscillation signals activated with a predetermined phase difference on the basis of the reference oscillation signal, and a pumping voltage generator for generating the pumping voltage through sequential charge pumping operations performed in response to the plurality of oscillation signals, respectively.

The invention allows a plurality of pumping voltage generation circuits to sequentially operate with a predetermined phase difference to reduce as much as possible noise that may occur in a pumping voltage, and to secure the stability and reliability of a circuit using the pumping voltage. Particularly, 'tDV' can be secured. Also, a circuit operating a pumping voltage generator is shared, so that net die yield per wafer can be increased.

DESCRIPTION OF SPECIFIC EMBODIMENTS

Hereinafter, an internal voltage generation circuit in accordance with the present invention will be described in detail with reference to the accompanying drawings.

Hereinafter, a preferred embodiment of the invention will be described with reference to the accompanying drawings in such a way that those skilled in the art can easily carry out the spirit of the invention.

Figure 2:
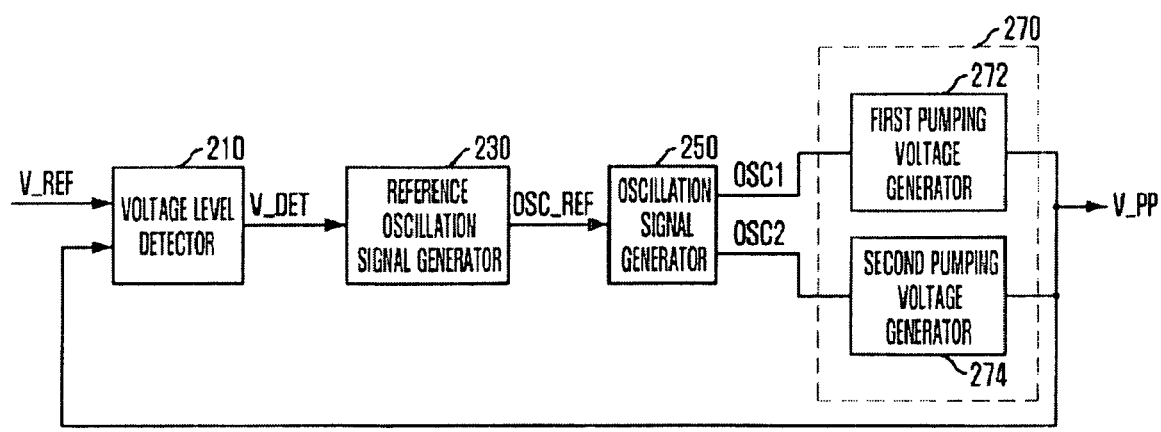
FIG. 2 is a block diagram of a pumping voltage generation circuit in accordance with a first embodiment of the present invention.

FIG. 2 is a block diagram of a pumping voltage generation circuit in accordance with a first embodiment of the invention.

Referring to FIG. 2, the pumping voltage generation circuit can include a voltage level detector 210, a reference oscillation signal generator 230, an oscillation signal generator 250, and a pumping voltage generator 270.

The voltage level detector 210 is designed for detecting a pumping voltage V_PP in relation to a reference voltage V_REF. For example, the voltage level detector 210 outputs a detection signal V_DET of a logic high level when the voltage level of the pumping voltage V_PP is lower than that of the reference voltage V_REF, and outputs a detection signal V_DET of a logic low level when the voltage level of the pumping voltage V_PP is higher than that of the reference voltage V_REF.

The reference oscillation signal generator 230 generates a reference oscillation signal OSC_REF of a predetermined frequency according to the detection result output by the voltage level detector 210, that is, the detection signal V_DET. For example, the reference oscillation signal generator 230 generates a reference oscillation signal OSC_REF oscillating at a predetermined frequency when the detection signal V_DET has a logic high level, and generates a reference oscillation signal OSC_REF that does not oscillate when the detection signal V_DET has a logic low level.

The oscillation signal generator 250 is designed for generating first and second oscillation signals OSC1 and OSC2 activated with a predetermined phase difference on the basis of the reference oscillation signal OSC_REF. The first oscillation signal OSC1 is a signal oscillating in response to the oscillating reference oscillation signal OSC_REF, and the second oscillation OSC2 is a signal oscillating with a predetermined phase difference relative to the first oscillation signal OSC1.

The pumping voltage generator 270 is designed to generate a pumping voltage V_PP through sequential charge pumping operations in response to the first and second oscillation signals OSC1 and OSC2. The pumping voltage generator 270 can include a first pumping voltage generator 272 and a second pumping voltage generator 274. The first pumping voltage generator 272 generates a pumping voltage V_PP in response to the first oscillation signal OSC1, and the second pumping voltage generator 274 generates a pumping voltage V_PP in response to the second oscillation signal OSC2.

In accordance with the invention, the oscillation signal generator 250 generates the first and second oscillation signals OSC1 and OSC2 activated with a predetermined phase difference, and the pumping voltage generator 270 can sequentially perform the charge pumping operations in response to the first and second oscillation signals OSC1 and OSC2. That is, the charge pumping operations are not performed at the same time, but rather are sequentially performed, so that noise in the pumping voltage V_can be reduced.

Figure 1:
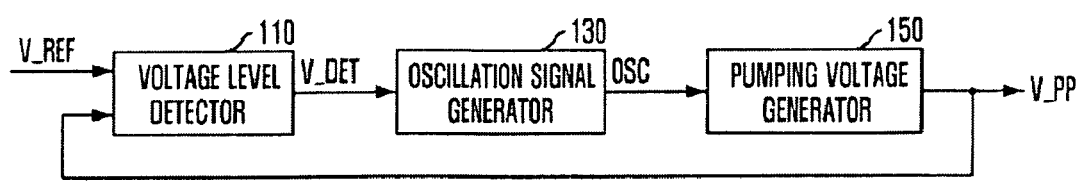
FIG. 1 is a block diagram of a general pumping voltage generation circuit.

The reference oscillation signal generator 230 is the same as the oscillation signal generator 130 of FIG. 1 in its technical realization and operation, and each of the first and second pumping voltage generators 272 and 274 is the same as the pumping voltage generator 150 of FIG. 1 in its technical realization and operation, descriptions thereof are omitted.

Figure 3:
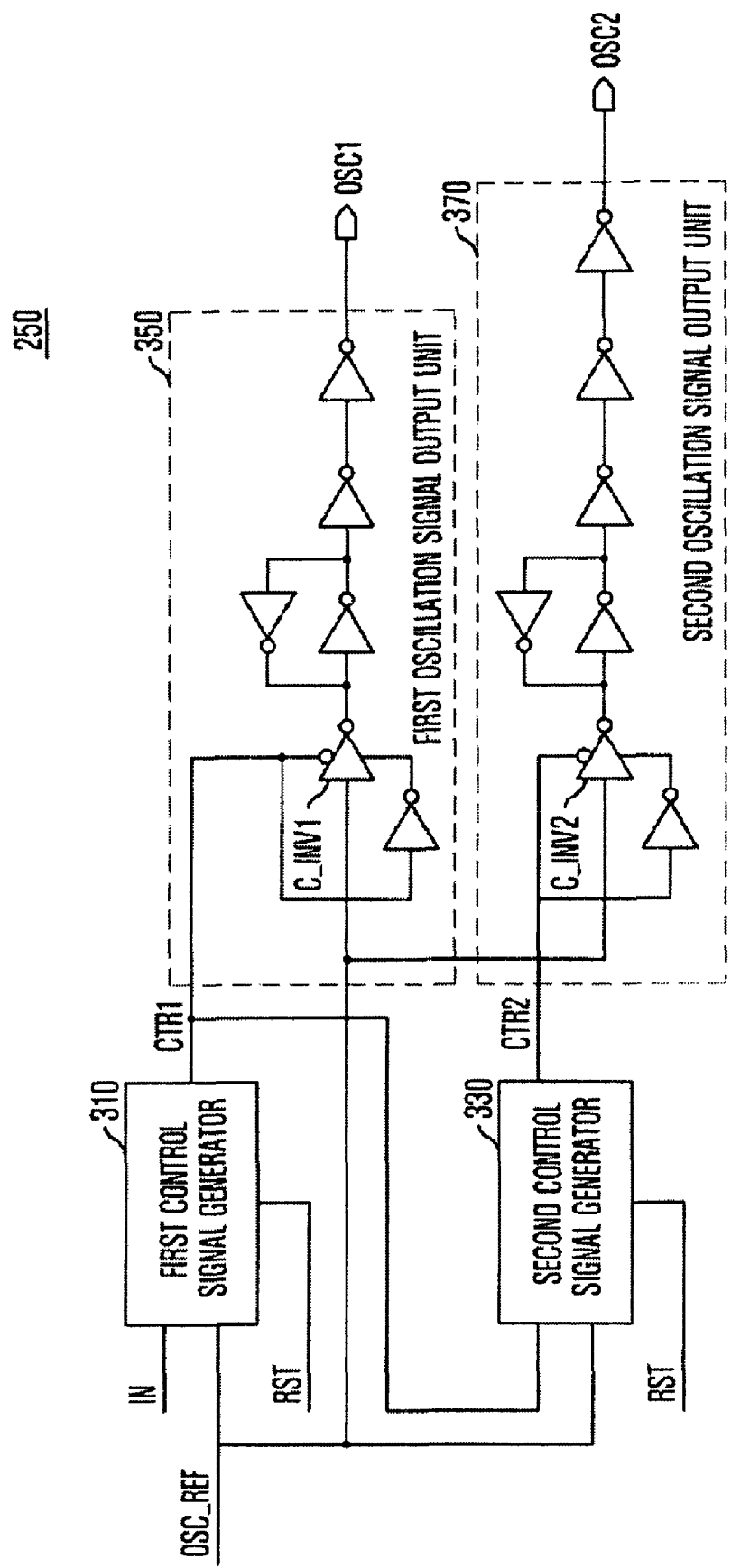
FIG. 3 is a block diagram of the oscillation signal generator (250) of FIG. 2.

FIG. 3 is a block diagram of the oscillation signal generator 250 of FIG. 2.

Referring to FIG. 3, the oscillation signal generator 250 can include first and second control signal generators 310 and 330, and first and second oscillation signal output units 350 and 370.

The first and second control signal generators 310 and 330 are designed for generating first and second control signals CTR1 and CTR2 sequentially activated in response to a reference oscillation signal OSC_REF. The first control signal generator 310 outputs an input signal IN as the first control signal CTR1 in response to the reference signal OSC_REF, and the second control signal generator 330 outputs the first control signal CTR1 as the second control signal CTR2 in response to the reference oscillation signal OSC_REF. The first and second control signal generators 310 and 330 are reset in response to reset signals RST. The technical realization of the first and second control signal generators 310 and 330 will be described with reference to FIG. 4.

The first and second oscillation signal output units 350 and 370 are designed for outputting the first and second oscillation signals OSC1 and OSC2 with respect to the reference oscillation signal OSC_REF in response to the first and second control signals CTR1 and CTR2. The first oscillation signal output unit 350 outputs the first oscillation signal OSC1 with respect to the reference oscillation signal OSC_REF in response to the first control signal CTR1, and the second oscillation signal output unit 370 outputs the second oscillation signal OSC2 with respect to the reference oscillation signal OSC_REF in response to the second control signal CTR2. At this point, the first oscillation signal OSC1 and the second oscillation signal OSC2 are sequentially activated and can have a phase difference of 180°.

Figure 4:
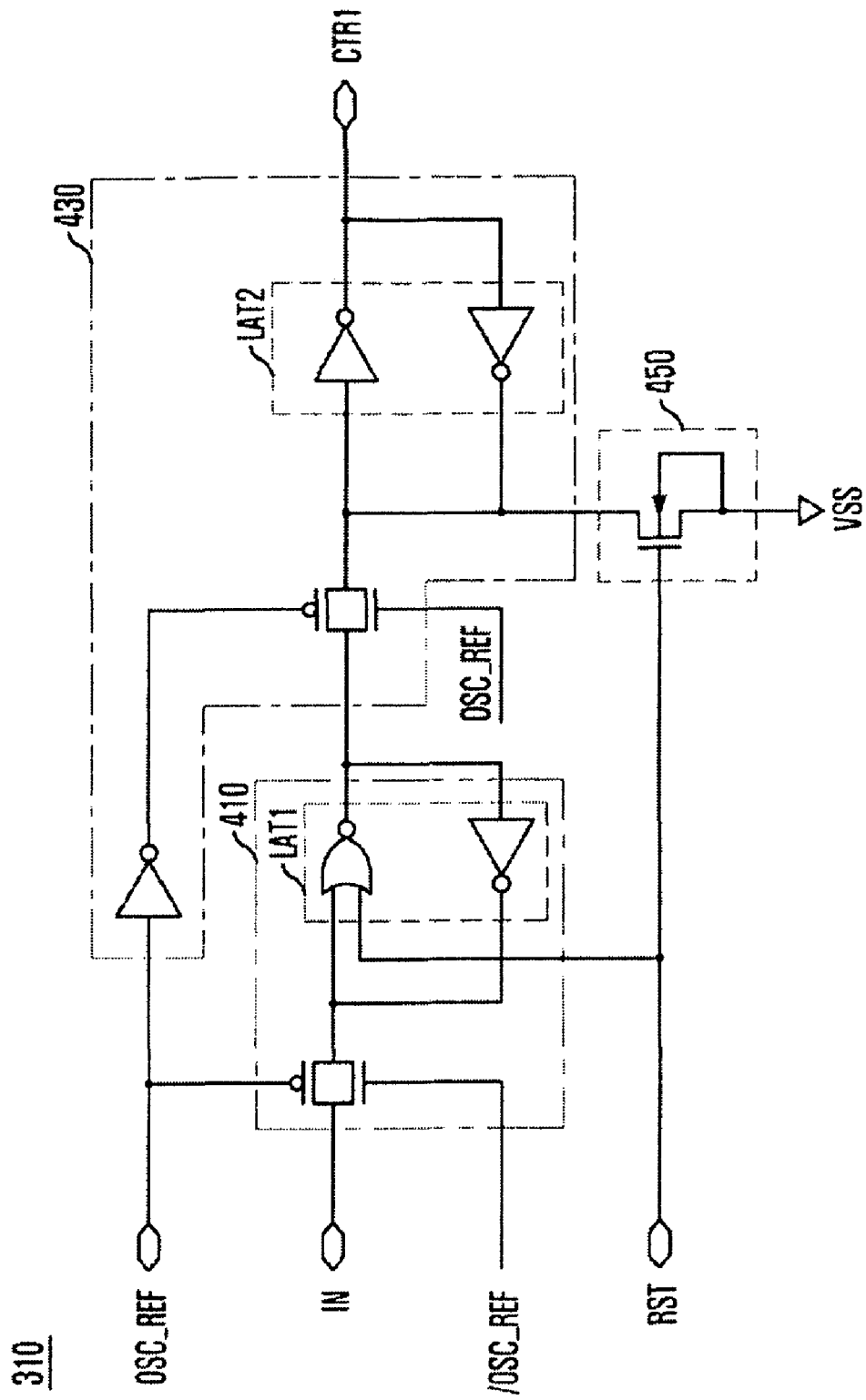
FIG. 4 is a circuit diagram of the first control signal generator (310) of FIG. 3.

FIG. 4 is a circuit diagram of the first control signal generator 310 of FIG. 3.

Referring to FIG. 4, the first control signal generator 310 can include a storage unit 410 and an output unit 430.

The storage unit 410 stores an input signal IN in a first latching unit LAT1 in response to a reference oscillation signal OSC_REF of a logic low level and an inverse signal of the reference oscillation signal OSC_REF, and the output unit 430 stores an output signal from the first latching unit LAT1 in a second latching unit LAT2 in response to a reference oscillation signal OSC_REF of a logic high level, and outputs the stored signal as the first control signal CTR1. Subsequently, a reset unit 450 resets the first and second latching units LAT1 and LAT2 in response to a reset signal RST of a logic low level.

Meanwhile, since the second control signal generator 330 is similar to the first control signal generator 310 in its technical realization, it is not additionally illustrated. The second control signal generator 330 stores the first control signal CTR1 in response to a reference oscillation signal OSC_REF of a logic low level, and outputs the stored first control signal CTR1 as the second control signal CTR2 in response to a reference oscillation signal OSC_REF of a logic high level.

Hereinafter, a simple operation will be described with reference to FIG. 2 to 4. In this case, an input signal IN has a logic low level.

When the voltage level of a pumping voltage V_is lower than that of the reference voltage V_REF, the voltage level detector 210 detects the lowered voltage level of the pumping voltage V_PP, and the reference oscillation signal generator 230 generates a reference oscillation signal OSC_REF of a predetermined frequency according to the detection result.

The first control signal generator 310 stores an input signal IN in the first latching unit LAT1 in response to a reference oscillation signal OSC_REF of a logic low level, and outputs an output signal of the first latching unit LAT1 as the first control signal CTR1 in response to a first point 1 at which the reference oscillation signal OSC_REF transitions to a logic high level. At this point, a first inverter C_INV1 is driven under control of the first control signal CTR1. The reference oscillation signal OSC_REF is output as the first oscillation signal OSC1.

After that, the second control signal generator 330 stores the first control signal CTR1 in response to a reference oscillation signal OSC_REF of a logic low level, and outputs the stored first control signal CTR1 as the second control signal CTR2 in response to a second point 2 at which the reference oscillation signal OSC_REF transitions to a logic high level. That is, the first control signal CTR1 and the second control signal CTR2 are sequentially activated. At this point, a second inverter C_INV2 is driven under control of the second control signal CTR2. The reference oscillation signal OSC_REF is output as the second oscillation signal OSC2.

Figure 5:
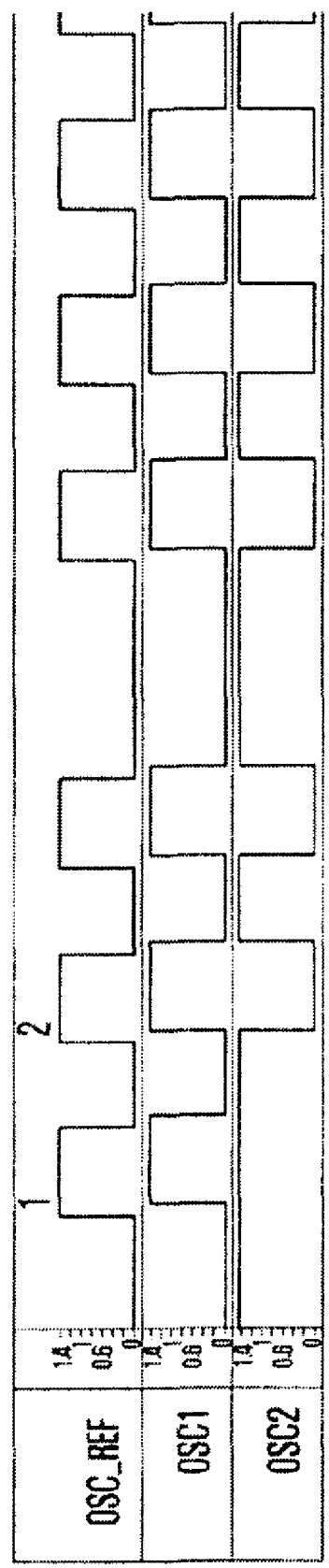
FIG. 5 is a waveform diagram of the reference oscillation signal (OSC_REF) and the first and second oscillation signals (OSC1, OSC2) of FIG. 3.

FIG. 5 is a waveform diagram of the reference oscillation signal OSC_REF and the first and second oscillation signals OSC1 and OSC2 of FIG. 3.

As illustrated in FIG. 5, since the first and second oscillation signals OSC1 and OSC2 are sequentially activated, first and second pumping voltage generators 272 and 274 of FIG. 2 are not simultaneously driven, so that charge pumping operation can be sequentially performed.

Also, since the first oscillation signal OSC1 and the second oscillation signal OSC2 have a phase difference of 180°, the rising edge of the first oscillation signal OSC1 can correspond to the falling edge of the second oscillation signal OSC2, or the falling edge of the first oscillation signal OSC1 can correspond to the rising edge of the second oscillation signal OSC2. That is, while the first pumping voltage generator 272 of FIG. 2 performs a charge pumping operation in response to the rising edge of the first oscillation signal OSC1, the second pumping voltage generator 274 can perform a charge pumping operation in response to the falling edge of the second oscillation signal OSC2. Alternatively, while the first pumping voltage generator 272 performs a charge pumping operation in response to the falling edge of the first oscillation signal OSC1, the second pumping voltage generator 274 can perform a charge pumping operation in response to the rising edge of the second oscillation signal OSC2.

The foregoing means that the maximum noise value of the pumping voltage V_can be reduced. For convenience in description, it is assumed that a noise value generated in a pumping voltage V_PP in response to a rising edge is 7, and a noise value generated in the pumping voltage V_PP in response to a falling edge is 3.

In the related art, all of pumping voltage generation circuits (it is assumed that the number of the circuits is two) perform a charge pumping operation in response to a rising edge. Accordingly, a noise value generated in a pumping voltage V_PP in response to the rising edge becomes 14 (7+7). Also, a noise value generated in the pumping voltage V_PP in response to a falling edge becomes 6 (3+3). At this point, a maximum noise value generated in the pumping voltage V_becomes 14.

However, since the first pumping voltage generator 272 performs a charge pumping operation in response to a rising edge and the second pumping voltage generator 274 performs a charge pumping operation in response to a falling edge in a pumping voltage generation circuit in accordance with a first embodiment of the invention, a noise value generated in a pumping voltage V_PP becomes 10 (7+3). Also, since the first pumping voltage generator 272 performs a charge pumping operation in response to a falling edge and the second pumping voltage generator 274 performs a charge pumping operation in response to a rising edge, a noise value generated in a pumping voltage V_PP also becomes 10. Therefore, a maximum noise generated in a pumping voltage V_PP becomes 10.

Consequently, the pumping voltage generation circuit in accordance with the invention can reduce a maximum noise value of a generated pumping voltage V_.

Figure 6:
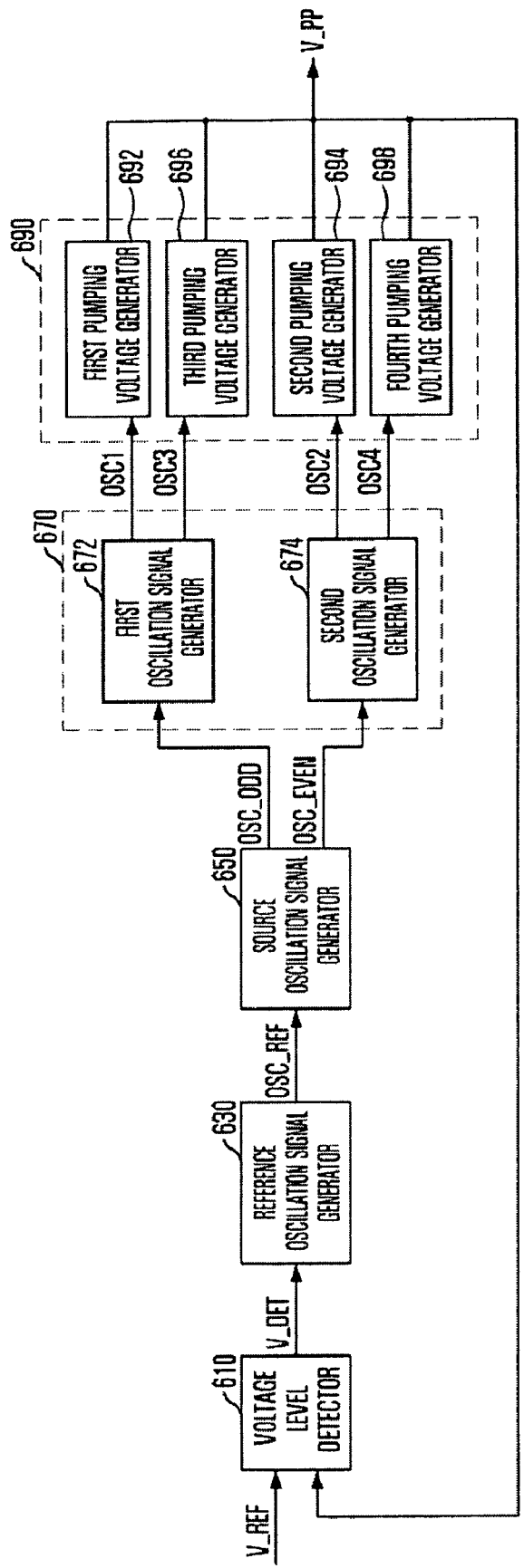
FIG. 6 is a block diagram of a pumping voltage generation circuit in accordance with a second embodiment of the invention.

FIG. 6 is a block diagram of a pumping voltage generation circuit in accordance with a second embodiment of the invention.

Referring to FIG. 6, the pumping voltage generation circuit can include a voltage level detector 610, a reference oscillation signal generator 630, a source oscillation signal generator 650, an oscillation signal generator 670, and a pumping voltage generator 690.

The voltage level detector 610 is designed for detecting a pumping voltage V_PP as compared with a reference voltage V_REF. For example, the voltage level detector 610 outputs a detection signal V_DET of a logic high level when the voltage level of a pumping voltage V_PP is lower than that of the reference voltage V_REF, and outputs a detection signal V_DET of a logic low level when the voltage level of a pumping voltage V_PP is higher than that of the reference voltage V_REF.

The reference oscillation signal generator 630 generates a reference oscillation signal OSC_REF of a predetermined frequency according to a detection result of the voltage level detector 610, that is, a detection signal V_DET. For example, the reference oscillation signal generator 630 generates a reference oscillation signal OSC_REF oscillating at a predetermined frequency when the detection signal V_DET has a logic high level, and generates a reference oscillation signal OSC_REF that does not oscillate when the detection signal V_DET has a logic low level.

The source oscillation signal generator 650 generates first and second source oscillation signals OSC_ODD and OSC_EVEN having a predetermined phase difference and whose transition points do not overlap each other on the basis the reference oscillation signal OSC_REF. The first source oscillation signal OSC_ODD is a signal oscillating in response to the reference oscillation signal OSC_REF, and the second source oscillation signal OSC_EVEN is an oscillation signal having a predetermined phase difference with respect to the first source oscillation signal OSC_ODD. Though description will be made regarding the first and second source oscillation signals OSC_ODD and OSC_EVEN with reference to FIG. 8, the first and second source oscillation signals OSC_ODD and OSC_EVEN are signals having a phase difference of 90° with respect to each other. The rising and falling edges of the first source oscillation signal OSC_ODD do not overlap the rising and falling edges of the second source oscillation signal OSC_EVEN. That is, the transition point of the first source oscillation signal OSC_ODD does not overlap that of the second source oscillation signal OSC_EVEN.

The oscillation signal generator 670 is designed for generating a plurality of oscillation signals OSC1, OSC2, OSC3 and OSC4 sequentially activated in response to the first and second source oscillation signals OSC_ODD and OSC_EVEN. The oscillation signal generator 670 can include first and second oscillation signal generators 672 and 674. The first oscillation signal generator 672 generates the first and third oscillation signals OSC1 and OSC3 sequentially activated in response to the first source oscillation signal OSC_ODD. The second oscillation signal generator 674 generates the second and fourth oscillation signals OSC2 and OSC4 sequentially activated in response to the second source oscillation signal OSC_EVEN.

The pumping voltage generator 690 is designed for generating pumping voltages V_PP in response to the plurality of oscillation signals OSC1, OSC2, OSC3 and OSC4, respectively. The pumping voltage generator 690 can include first to fourth pumping voltage generators 692, 694, 696 and 698. The first pumping voltage generator 692 generates a pumping voltage V_PP through a charge pumping operation in response to the first oscillation signal OSC1, the second pumping voltage generator 694 generates a pumping voltage V_PP through a charge pumping operation in response to the second oscillation signal OSC2, the third pumping voltage generator 696 generates a pumping voltage V_PP through a charge pumping operation in response to the third oscillation signal OSC3, and the fourth pumping voltage generator 698 generates a pumping voltage V_PP through a charge pumping operation in response to the fourth oscillation signal OSC4.

In accordance with the second embodiment of the invention, the source oscillation signal generator 650 generates the first and second source oscillation signals OSC_ODD and OSC_EVEN having a predetermined phase difference and whose transition points do not overlap each other on the basis of the reference oscillation signal OSC_REF. The first and second oscillation signal generators 672 and 674 generates the plurality of oscillation signals OSC1, OSC2, OSC3 and OSC4 sequentially activated in response to the first and second source oscillation signals OSC_ODD and OSC_EVEN. Therefore, the first to fourth pumping voltage generators 692, 694, 696 and 698 can generate a noise-reduced pumping voltage V_PP through sequential charge pumping operations in response to the plurality of oscillation signals OSC1, OSC2, OSC3 and OSC4.

Since the technical realizations of the voltage level detector 610, the reference oscillation signal generator 630, the first to fourth pumping voltage generators 692, 694, 696 and 698 are obvious to those skilled in the art as described in the previous embodiment, detailed descriptions thereof are omitted. The source oscillation signal generator 650, and the first and second oscillation signal generators 672 and 674, which are closely related to the second embodiment will be described.

Figure 7:
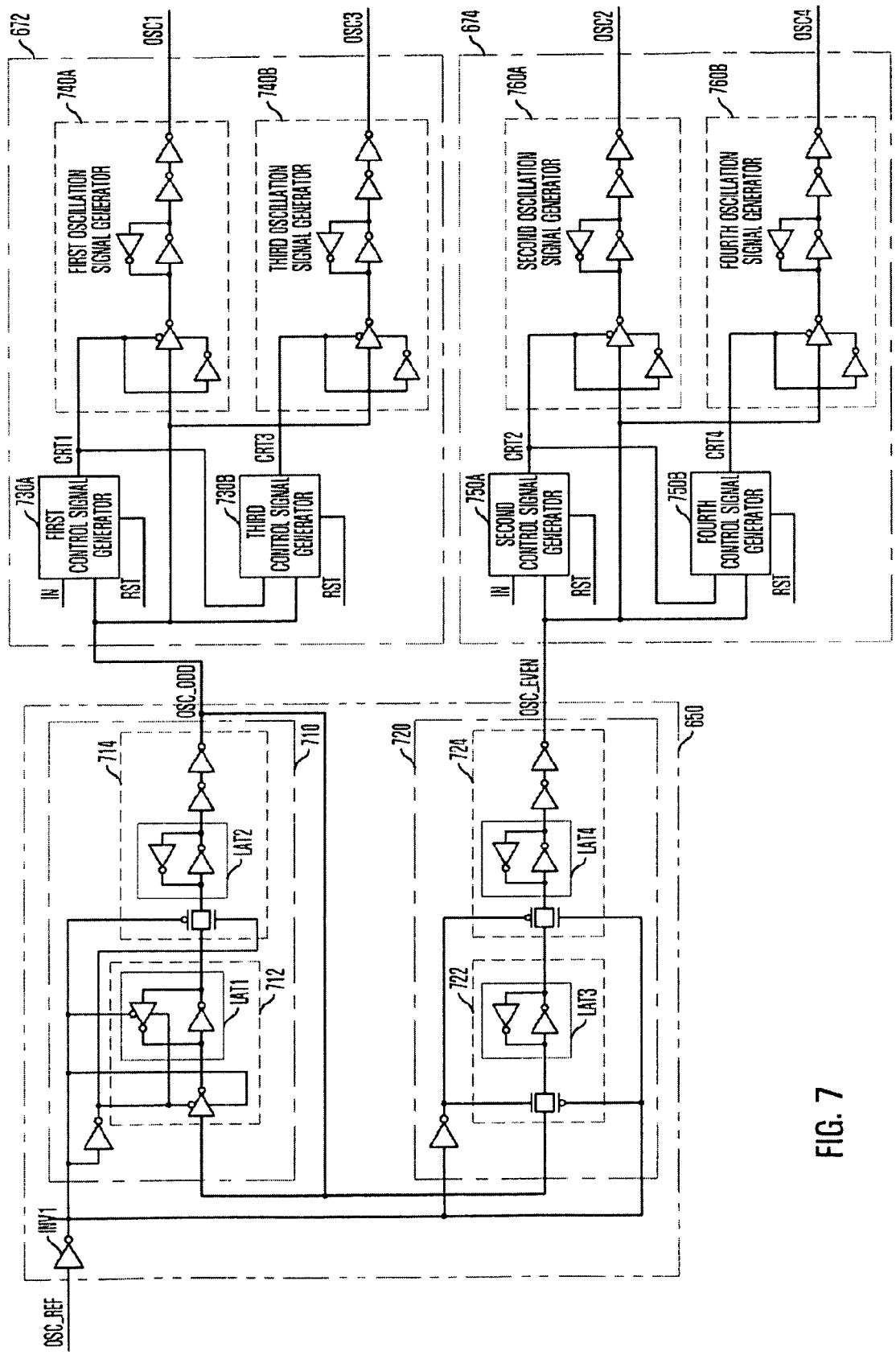
FIG. 7 is a circuit diagram of the source oscillation signal generator 650, and the first and second oscillation signal generators (672, 674) of FIG. 6.

FIG. 7 is a circuit diagram of the source oscillation signal generator 650, and the first and second oscillation signal generators 672 and 674 of FIG. 6.

Referring to FIG. 7, the source oscillation signal generator 650 can include a clock divider 710 and a clock shifter 720. A first inverter INV1 is designed for adjusting a logic level value suitable for a circuit operation, and for buffering the reference oscillation signal OSC_REF. The first inverter INV1 receives the reference oscillation signal OSC_REF and inverts and outputs the reference oscillation signal OSC_REF.

The clock divider 710 divides the reference oscillation signal OSC_REF to generate a first source oscillation signal OSC_ODD. The clock divider 710 can include a first storage unit 712 and a first output unit 714. The first storage unit 712 stores a fed-back first source oscillation signal OSC_ODD in response to the reference oscillation signal OSC_REF. The first output unit 714 outputs an output signal of the first storage unit 712 as the first source oscillation signal OSC_ODD in response to the reference oscillation signal OSC_REF.

The clock shifter 720 shifts the first source oscillation signal OSC_ODD in response to the reference oscillation signal OSC_REF and outputs the shifted first source oscillation signal OSC_ODD as the second source oscillation signal OSC_EVEN. The clock shifter 720 can include a second storage unit 722 and a second output unit 724. The second storage unit 722 stores the first source oscillation signal OSC_ODD in response to the reference oscillation signal OSC_REF, and the second output unit 724 outputs an output signal of the second storage unit 722 as the second source oscillation signal OSC_EVEN in response to the reference oscillation signal OSC_REF.

The simple operations of the clock divider 710 and the clock shifter 720 are described below.

When the oscillating reference oscillation signal OSC_REF is input to the clock divider 710, the first storage unit 712 delivers the first source oscillation signal OSC_ODD to the first output unit 714 in response to the falling edge of the reference oscillation signal OSC_REF, and stores an output signal being delivered to the first output unit 714 in a first latching unit LAT1 in response to the rising edge of the reference oscillation signal OSC_REF. Also, the first output unit 714 stores an output signal of the first storage unit 712 in a second latching unit LAT2, and outputs the stored signal as the first source oscillation signal OSC_ODD in response to the rising edge of the reference oscillation signal OSC_REF. Consequently, the clock divider 710 divides the reference oscillation signal OSC_REF to generate the first source oscillation signal OSC_ODD.

Next, when the oscillating reference oscillation signal OSC_REF is input to the clock shifter 720, the second storage unit 722 stores the first oscillation signal OSC_ODD in a third latching unit LAT3 in response to the rising edge of the reference oscillation signal OSC_REF, and the second output unit 724 stores an output signal of the second storage unit 722 in a fourth latching unit LAT4 and outputs the stored signal as the second source oscillation signal OSC_EVEN in response to the falling edge of the reference oscillation signal OSC_REF. Consequently, the clock shifter 720 synchronizes the first source oscillation signal OSC_ODD with the falling edge of the reference oscillation signal OSC_REF and outputs the synchronized first source oscillation signal OSC_ODD as the second source oscillation signal OSC_EVEN.

Figure 8:
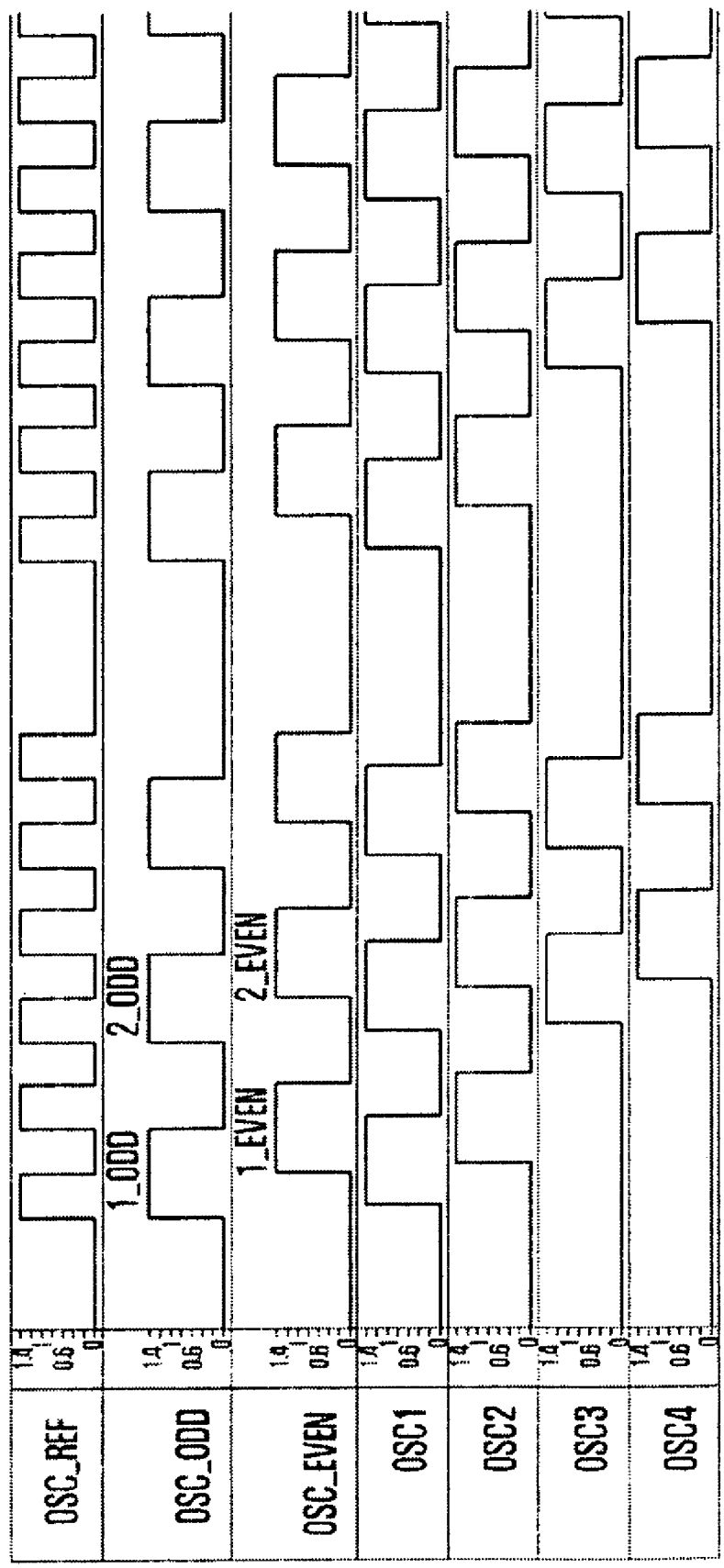
FIG. 8 is a waveform diagram of respective signals used in FIG. 7.

FIG. 8 is a waveform diagram of respective signals used in FIG. 7. For convenience in description, the reference oscillation signal OSC_REF, the first source oscillation signal OSC_ODD, and the second source oscillation signal OSC_EVEN are mainly described.

Referring to FIG. 8, when the reference oscillation signal OSC_REF starts to oscillate, the first source oscillation signal OSC_ODD divided from the reference oscillation signal OSC_REF is generated, and then the second source oscillation signal OSC_EVEN shifted from the first source oscillation signal OSC_ODD is generated. The first source oscillation signal OSC_ODD and the second source oscillation signal OSC_EVEN are signals having a phase difference of 90°, and transition points thereof do not overlap each other.

In the case where the pumping voltage generation circuit includes two pumping voltage generators of the first and second pumping voltage generators 272 and 274 as illustrated in FIG. 2, the first and second source oscillation signals OSC_ODD and OSC_EVEN can be directly used to reduce a noise of a pumping voltage V_PP. In other words, since the rising and falling edges of the first source oscillation signal OSC_ODD do not overlap the rising and falling edges of the second source oscillation signal OSC_EVEN, the first pumping voltage generator 272 performs a charge pumping operation in response to the rising edge of the first source oscillation signal OSC_ODD, then the second pumping voltage generator 274 performs a charge pumping operation in response to the rising edge of the second source oscillation signal OSC_EVEN, then the first pumping voltage generator 272 performs a charge pumping operation in response to the falling edge of the first source oscillation signal OSC_ODD, then the second pumping voltage generator 274 performs a charge pumping operation in response to the falling edge of the second source oscillation signal OSC_EVEN.

Consequently, since the transition points of the first and second source oscillation signals OSC_ODD and OSC_EVEN do not overlap each other, charge pumping operations can be sequentially performed, so that a noise generated in the pumping voltage V_can be reduced as much as possible.

The first and second oscillation signal generators 672 and 674 will be described with reference to FIG. 7.

The first oscillation signal generator 672 can include first and third control signal generators 730A and 730B, and first and third oscillation signal output units 740A and 740B.

The first and third control signal generators 730A and 730B are designed for generating first and third control signals CTR1 and CTR3 sequentially activated in response to the first source oscillation signal OSC_ODD. The first control signal generator 730A outputs an input signal IN as the first control signal CTR1 in response to the first source oscillation signal OSC_ODD. The third control signal generator 730B outputs the first control signal CTR1 as the third control signal CTR3 in response to the first source oscillation signal OSC_ODD. The first and third control signal generators 730A and 730B are reset in response to a reset signal RST. Since the technical realizations of the first and third control signal generators 730A and 730B are the same as those in FIG. 4, detailed descriptions thereof are omitted.

The first and third oscillation signal output units 740A and 740B are designed for outputting the first source oscillation signals OSC_ODD as the first and third oscillation signals OSC1 and OSC3 in response to the first and third control signals CTR1 and CTR3. The first oscillation signal output unit 740A outputs the first source oscillation signal OSC_ODD as the first oscillation signal OSC1 in response to the first control signal CTR1, and the third oscillation signal output unit 740B outputs the first source oscillation signal OSC_ODD as the third oscillation signal OSC3 in response to the third control signal CTR3. At this point, the first and third oscillation signals OSC1 and OSC3 have a phase difference of 360°.

Meanwhile, the second oscillation signal generator 674 can include second and fourth control signal generators 750A and 750B, and second and fourth oscillation signal output units 760A and 760B.

The second and fourth control signal generators 750A and 750B are designed for generating second and fourth control signals CTR2 and CTR4 sequentially activated in response to the second source oscillation signal OSC_EVEN. The second control signal generator 750A outputs an input signal IN as the second control signal CTR2 in response to the second source oscillation signal OSC_EVEN. The fourth control signal generator 750B outputs the second control signal CTR2 as the fourth control signal CTR4 in response to the second source oscillation signal OSC_EVEN. The second and fourth control signal generators 750A and 750B are also reset in response to a reset signal RST. Since the technical realizations of the second and fourth control signal generators 750A and 750B are also substantially the same as those in FIG. 4, detailed descriptions thereof are omitted.

The second and fourth oscillation signal output units 760A and 760B are designed for outputting the second source oscillation signals OSC_EVEN as the second and fourth oscillation signals OSC2 and OSC4 in response to the second and fourth control signals CTR2 and CTR4. The second oscillation signal output unit 760A outputs the second source oscillation signal OSC_EVEN as the second oscillation signal OSC2 in response to the second control signal CTR2, and the fourth oscillation signal output unit 760B outputs the second source oscillation signal OSC_EVEN as the fourth oscillation signal OSC4 in response to the fourth control signal CTR4. At this point, the second and fourth oscillation signals OSC2 and OSC4 have a phase difference of 360°.

Therefore, the first to fourth control signal generators 730A, 730B, 750A and 750B can generate the first to fourth control signals CTR1, CTR2, CTR3 and CTR4 sequentially activated in response to the first and second source oscillation signals OSC_ODD and OSC_EVEN. The first to fourth oscillation signal output units 740A, 740B, 760A and 760B can sequentially generate the first to fourth oscillation signals OSC1, OSC2, OSC3 and OSC4 in response to the first to fourth control signals CTR1, CTR2, CTR3 and CTR4.

The waveforms of respective signals will be described with reference to FIG. 8.

FIG. 8 is a waveform diagram of the reference oscillation signal OSC_REF, the first source oscillation signal OSC_ODD, the second source oscillation signal OSC_EVEN, and the first to fourth oscillation signals OSC1, OSC2, OSC3 and OSC4.

The first source oscillation signal OSC_ODD divided from the reference oscillation signal OSC_REF transitions from a logic low level to a logic high level, and a logic high level to a logic low level in response to the rising edge of the reference oscillation signal OSC_REF. Also, the second source oscillation signal OSC_EVEN shifted by a phase of 90° from the first source oscillation signal OSC_ODD transitions from a logic low level to a logic high level, and a logic high level to a logic low level in response to the falling edge of the reference oscillation signal OSC_REF.

Subsequently, the first oscillation signal OSC1 oscillates in response to a first point 1_ODD at which the first source oscillation signal OSC_ODD transitions to a logic high level, and the third oscillation signal OSC3 oscillates in response to a second point 2_ODD at which the first source oscillation signal OSC_ODD transitions to a logic high level. Also, the second oscillation signal OSC2 oscillates in response to a first point 1_EVEN at which the second source oscillation signal OSC_EVEN transitions to a logic high level, and the fourth oscillation signal OSC4 oscillates in response to a second point 2_EVEN at which the second source oscillation signal OSC_EVEN transitions to a logic high level.

Consequently, since the first to fourth oscillation signals OSC1, OSC2, OSC3 and OSC4 are sequentially activated, the first to fourth pumping voltage generators 692, 694, 696 and 698 operating in response thereto are not simultaneously driven, but perform charge pumping operations sequentially. That is, the first to fourth oscillation signals OSC1, OSC2, OSC3 and OSC4 have a phase difference of 90°, the transition points of the first and second oscillation signals OSC1 and OSC2 do not overlap those of the third and fourth oscillation signals OSC3 and OSC4, and the first and second pumping voltage generators 692 and 694, and the third and fourth pumping voltage generators 696 and 698 perform charge pumping operations such that they do not overlap each other.

With this construction, the noise value of a pumping voltage V_can be also reduced. For convenience in description, it is assumed that a noise value generated in response to a rising edge is 7, and a noise value generated in response to a falling edge is 3.

In the related art, all of pumping voltage generation circuits (it is assumed that the number of the circuits is four) perform a charge pumping operation in response to a rising edge. Accordingly, a noise value generated in a pumping voltage V_PP in response to the rising edge becomes 28 (7×4). Also, a noise value generated in the pumping voltage V_PP during the charge pumping operation in response to a falling edge becomes 12 (3×4). At this point, a maximum noise value generated in the pumping voltage V_becomes 28.

However, in a pumping voltage generation circuit in accordance with the second embodiment of the invention, when the voltage level of a pumping voltage V_PP is slightly lower than that of the reference voltage V_REF (the oscillation section of the reference oscillation signal OSC_REF is short), only the first and second pumping voltage generators 692 and 694 can be driven. At this point, a maximum noise value generated in the pumping voltage V_in response to a rising edge becomes 7. Also, when the voltage level of a pumping voltage V_PP is much lower than that of the reference voltage V_REF (the oscillation section of the reference oscillation signal OSC_REF is long), all of the first to fourth pumping voltage generators 692, 694, 696 and 698 can be driven. At this point, a maximum noise value generated in the pumping voltage V_PP in response to the rising edges of the first and third oscillation signals OSC1 and OSC3 or the rising edges of the second and fourth oscillation signals OSC2 and OSC4 becomes 14 (7×2).

Figure 9:
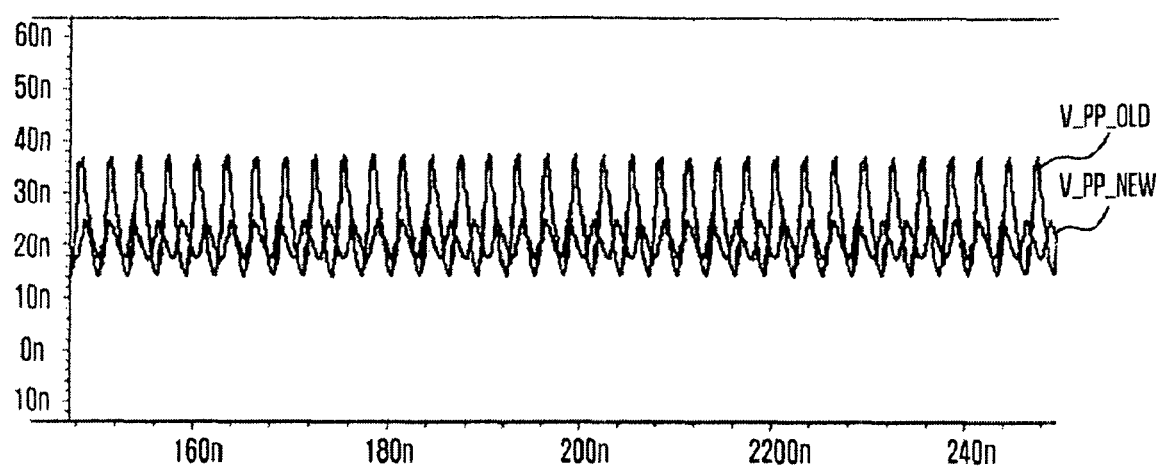
FIG. 9 is a view illustrating simulation results of the noise of a pumping voltage (V——PP) in accordance with the related art and the invention.

FIG. 9 is a view illustrating simulation results of the noise of a pumping voltage V_in accordance with the related art and the invention.

Specifically, FIG. 9 illustrates a simulation result of a pumping voltage noise V_PP_OLD for the case where conventional pumping voltage generation circuits perform charge pumping operations at a time in response to the same edge, and a simulation result of a pumping voltage noise V_PP_NEW for the case where pumping voltage generation circuits sequentially perform charge pumping operations in accordance with the invention (particularly, the second embodiment). As revealed from FIG. 9, the noise generated in the pumping voltage is remarkably reduced.

As described above, the pumping voltage generation circuit in accordance with the invention can reduce, as much as possible, a noise of a pumping voltage V_PP that may be generated by charge pumping operations. Therefore, the stability and reliability of a circuit that uses this pumping voltage V_PP. Particularly, stable 'tDV' of a device inputting/outputting data in high speed can be secured.

Also, instead of providing a plurality of pumping voltage generation circuits as in the related art, peripheral circuits (the voltage level detector, the reference oscillation signal generator, and a (source) oscillation signal generator) for driving a plurality of pumping voltage generators are shared in accordance with the invention as described in the first and second embodiments. Therefore, a net die yield per wafer can be increased, and improvement in productivity through the net die yield per wafer increase can reduce manufacturing costs.

The invention allows a plurality of pumping voltage generation circuits to sequentially operate to reduce a noise generated in a pumping voltage as much as possible, thereby securing the stability and reliability of a circuit using an internal voltage, and particularly, securing 'tDV' determined as specification.

Also, a circuit operating a pumping voltage generator is shared, so that net die yield per wafer can be increased and thus manufacturing costs can be reduced.

While the invention has been described with respect to the specific embodiments, it is noted that the embodiments should be considered in descriptive sense only and not for purposes of limitation it will be apparent to those skilled in the art that various changes and modifications may be made without departing from the spirit and scope of the invention as defined in the following claims.

Also, a logic gate and a transistor exemplified in the above-described embodiments may be modified in their position and kind, depending on the polarity of an input signal.

Also, though description has been made for the case where a plurality of oscillation signals have phase differences of 180° and 90° in the above embodiments, the invention can be applied to a case of having other phase differences. Also, though description has been made for the case of generating a pumping voltage V_PP, the invention can be readily applied to all the voltages generated through a charge pumping operation as well as a substrate bias voltage.

What is claimed is:

1. An internal voltage generation circuit, comprising:
a reference oscillation signal generator configured to generate a reference oscillation signal according to a result of a comparison of a pumping voltage with a reference voltage;
an oscillation signal generator configured to generate a plurality of oscillation signals having a predetermined phase difference, in response to the reference oscillation signal; and
a pumping voltage generator configured to generate the pumping voltage through sequential charge pumping operations performed in response to the respective oscillation signals,
wherein the oscillation signal generator includes a plurality of control signal generators configured to generate a plurality of control signals sequentially activated in response to the reference oscillation signal, and a plurality of oscillation signal output units configured to output the plurality of oscillation signals in response to the plurality of control signals, and wherein the plurality of control signal generators include a first control signal generator configured to output an input signal as a first control signal in response to the reference oscillation signal, and at least one second control signal generator configured to output the first control signal as a second control signal in response to the reference oscillation signal.

2. The internal voltage generation circuit as recited in claim 1, wherein each of the plurality of control signal generators includes:

a storage unit configured to store an input signal in response to the reference oscillation signal; and an output unit configured to output an output signal of the storage unit as a corresponding control signal in response to the reference oscillation signal.

3. The internal voltage generation circuit as recited in claim 1, wherein the plurality of oscillation signals have respective phase differences of 180°.

4. The internal voltage generation circuit as recited in claim 1, wherein the pumping voltage generator includes a plurality of charge pumping units configured to perform charge pumping operations in response to the respective plurality of oscillation signals.

5. An internal voltage generation circuit, comprising:

a reference oscillation signal generator configured to generate a reference oscillation signal according to a result of a comparison of a pumping voltage with a reference voltage;

an oscillation signal generator configured to generate a plurality of oscillation signals having a predetermined phase difference, in response to the reference oscillation signal; and a pumping voltage generator configured to generate the pumping voltage through sequential charge pumping operations performed in response to the respective oscillation signals, wherein the oscillation signal generator includes a plurality of control signal generators comprising:

a first control signal generator configured to generate a first control signal based on an input signal in response to the reference oscillation signal; and a second control signal generator configured to generate a plurality of second control signals in response to the reference oscillation signal, each second control signal is generated based on a previous second control signal.

6. The internal voltage generation circuit as recited in claim 5, wherein the first control signal and the plurality of second control signals are sequentially activated in response to the reference oscillation signal.

7. The internal voltage generation circuit as recited in claim 6, further comprising:

a plurality of oscillation signal output units configured to output the plurality of oscillation signals in response to the first control signal and the plurality of second control signals.

8. The internal voltage generation circuit as recited in claim 5, wherein each of the plurality of control signal generators includes:

a storage unit configured to store an input signal in response to the reference oscillation signal; and an output unit configured to output an output signal of the storage unit as a corresponding control signal in response to the reference oscillation signal.

9. The internal voltage generation circuit as recited in claim 5, wherein the plurality of oscillation signals have respective phase differences of 180°.

10. The internal voltage generation circuit as recited in claim 5, wherein the pumping voltage generator includes a plurality of charge pumping units configured to perform charge pumping operations in response to the respective plurality of oscillation signals.

* * * * *